United States Patent [19]

Kawamura et al.

[11] Patent Number: 4,658,300
[45] Date of Patent: Apr. 14, 1987

[54] SYSTEM AND METHOD FOR PROCESSING IMAGE SIGNALS

[75] Inventors: Hideaki Kawamura, Tokyo; Nobuaki Sakurada, Yokohama; Takashi Sasaki, Tokyo, all of Japan

[73] Assignee: Canon Kabushiki Kaisha, Tokyo, Japan

[21] Appl. No.: 586,189

[22] Filed: Mar. 5, 1984

[30] Foreign Application Priority Data

Mar. 8, 1983 [JP] Japan .................................. 58-37700
Mar. 8, 1983 [JP] Japan .................................. 58-37701
Jul. 15, 1983 [JP] Japan .................................. 58-129245

[51] Int. Cl.$^4$ ...................... H04N 1/40; H04N 11/06; H04N 7/12
[52] U.S. Cl. ...................... 358/280; 358/13; 358/138; 358/135; 358/284
[58] Field of Search ............ 358/280, 284, 294, 335, 358/339, 140, 138, 244, 242, 135, 13, 153, 166, 133, 287

[56] References Cited

U.S. PATENT DOCUMENTS 4,068,265  1/1978  Russell ............................. 358/133
4,068,266  1/1978  Liao ................................ 358/280

Primary Examiner—Howard W. Britton
Assistant Examiner—John K. Peng
Attorney, Agent, or Firm—Fitzpatrick, Cella, Harper & Scinto

[57] ABSTRACT

A video signal processing method and apparatus retrieves pixel signals by sampling an input video signal consisting of a plurality of horizontal scanning lines. In this method, the ratio of the number of vertical pixels to the number of horizontal scanning lines is set into for example 2 or less; in the vertical direction, the pixel signals of the vertical pixels are obtained by the interpolation on the basis of the pixel signals sampled from a plurality of horizontal scanning lines; while in the horizontal direction, the input video signal is sampled at the horizontal sampling frequency to be determined by that ratio. In the above interpolation processing, the ratio of the number of recording pixels to the number of original pixels in the direction of height or width of an image picture is set into $$\frac{2^M}{2n+1}$$

(where, n and M are positive integers). There is also provided a video signal recording system for recording the image picture in accordance with the pixel signals to be obtained by the sampling circuit on a recording paper. According to the present invention, it is possible to obtain and print out high-quality image pictures with desired various sizes without changing dot densities by means of a simple processing circuit.

18 Claims, 17 Drawing Figures

FIG.1(a) FIG.1(b)
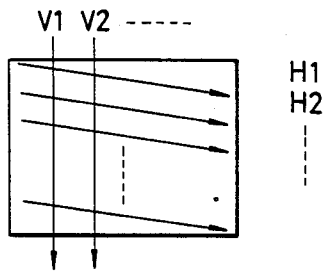
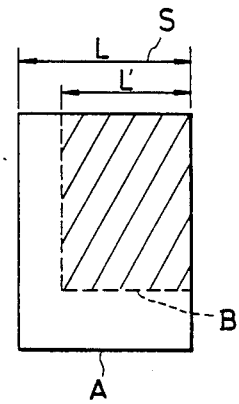
FIG.2
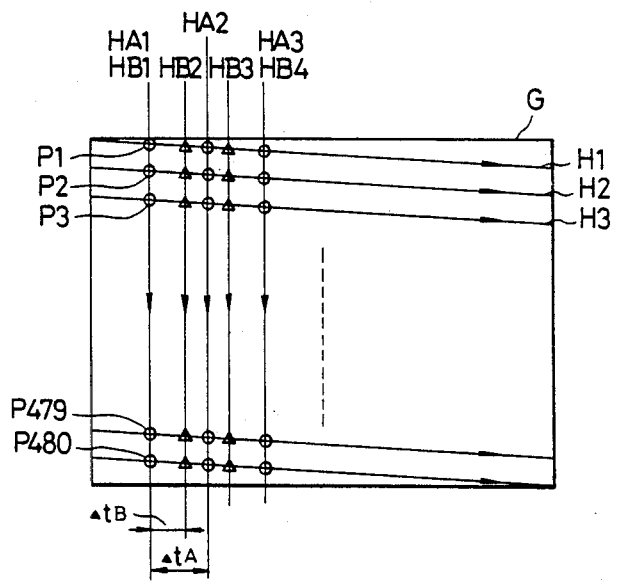

$$\frac{a'+7b'}{8}$$

$$\frac{b'+3c'}{4}$$

$$\frac{3c'+5d'}{8}$$

$$\frac{d'+e'}{2}$$

$$\frac{5e'+3f'}{8}$$

$$\frac{3f'+g'}{4}$$

$$\frac{7g'+h'}{8}$$

SYSTEM AND METHOD FOR PROCESSING IMAGE SIGNALS

BACKGROUND OF THE INVENTION

1. Field of the Invention

The present invention relates to a video signal processing method to obtain a pixel signal from an input video signal and, more particularly, to a video signal processing method to obtain a pixel signal by sampling an input video signal which consists of a plurality of horizontal scanning lines, such as a television signal and the like.

In addition, the present invention relates to a video recording system for recording an image picture in accordance with that video signal.

2. Description of the Prior Art

Conventionally, when a hard copy is taken from a video signal such as a TV image picture, a graphic display or the like, the pixel (picture element) constitution ratio is determined so as not to cause the distortion in height and width. For example in an NTSC standard television signal, since the number of horizontal scanning lines of one frame is 525 in the interlaced scanning and the number of effective pixels in the vertical direction is about 480, when the height to width ratio is set into 3:4, one picture plane in the horizontal direction is constituted by 640 pixels.

Therefore, in case of expressing the intermediate gradient in dependence upon a size of a dot by forming one dot for one pixel, unless the dots are arranged with a density of at least 6 dots/mm or more, an image picture will become rough, so that an image picture having satisfactory high picture quality cannot be obtained. A size of the image picture at this time is about 8×10.7 cm and this size is too small to constitute a picture plane. Therefore, to obtain a large image picture, it is considered a method of making additional pixel data between the sampled pixels using a mathematical interpolating method; however, this method causes the resolution power of the image picture to deteriorate, resulting in a dimmed image picture.

In addition, it is considered a method of increasing the number of sample pixels by raising the sampling frequency, but it is impossible to increase the number of sample pixels since the number of sample pixels in the vertical direction of a picture plane is limited by the number of horizontal scanning lines of the input video signal.

On one hand, in video signal recording systems for recording the sampled video signal, most of them generally sample the video signal consisting of a plurality of horizontal scanning lines in the direction perpendicular to the horizontal scanning direction of such video signal, thereby printing out. In case of performing the printout in such a form, since the main scanning width of the printer corresponds to the number of horizontal scanning lines, the video signal must be recorded by shortening a length of the main scanning line to reduce the image picture.

This point will be described with reference to the drawings. FIG. 1A shows a CRT screen by a video signal, in which H1, H2, . . . are horizontal scanning lines. The sampling is done with sample lines V1, V2, . . . which are almost perpendicular to these horizontal scanning lines. FIG. 1B shows a picture plane formed by a printer, in which A denotes a picture plane of the normal size; B is a picture plane of the reduced size; L is a length of the main scanning line of the printer; and S indicates the main scanning direction.

Although the signals V1, V2, . . . obtained are recorded along the main scanning direction S, since the main scanning length corresponds to the number of horizontal scanning lines, they must be recorded by shortening the main scanning length to obtain the reduced picture plane B.

This method results in waste of time corresponding to only the distance of L—L' for the printer since it is not easy to change the constitution of the printer so as to scan the distance L' in spite of the fact that the printer can inherently perform the main scanning for only L. In addition, since the main scanning distance becomes short, a part of the sampled pixels of only the number corresponding to the number of horizontal scanning lines has to be deleted through thinning-out, or the interpolation processing must be carried out, so that picture quality deteriorates and at the same time a complicated processor has to be used.

In addition, in the case where the multiplying ratio of the number of recording pixels to the number of original pixels in the main scanning direction or the sub-scanning direction of the recording means is represented by N (where, N is a positive integer), for example as shown in Japanese Utility Model Publication Laid-Open No. 27590/83, the same original pixel may be used as the recording pixel N times in the main scanning and sub-scanning directions. On the other hand, when the above-mentioned multiplying ratio is represented by 1/N, only one pixel among the N original pixels may be used as the recording pixel.

However, if the above multiplying ratio cannot be represented by N or 1/N, etc., it is impossible to use the original pixel as it is as the recording pixel, so that a special operation such as the division or the like will be needed. Thus, a complicated circuit is necessary to realize this special operation.

SUMMARY OF THE INVENTION

It is an object of the present invention to provide a video signal processing method and apparatus which can obtain an image picture with high quality even when a size of an image picture changes in consideration of such problems as mentioned above.

In addition, it is another object of the present invention to provide a video signal recording system which can vary a size of a picture plane and can print an image picture with less deterioration in picture quality even when the picture plane size is changed.

An apparatus for sample-processing the video signal and recording means for recording the image picture may be constituted integrally or separately.

Still another object of the present invention is to provide an image processing method and apparatus which can find out a value of recording pixels by way of a simple method even when the multiplying ratio of the image picture size cannot be represented by N or 1/N.

The above and other objects, features and advantages of the present invention will become apparent from the following detailed description with reference to the accompanying drawings.

BRIEF DESCRIPTION OF THE DRAWINGS

FIGS. 1A and 1B are diagrams to describe a conventional technology;

FIG. 2 is a diagram to describe a sampling method;

FIG. 4 is a diagram to describe the interpolating operation;

FIG. 15 is a diagram to describe the pixel conversion when the multiplying ratio is 8/7.

DETAILED DESCRIPTION OF THE PREFERRED EMBODIMENT

There will be described an example hereinbelow whereby an NTSC video signal is processed to form a hard copy.

In general, since the height to width ratio of a screen of a TV receiver is 3:4, the number of pixels which can be sampled from the NTSC signal is 480×640 pixels. In case of forming an image picture having a satisfactory high resolution power using one dot per one pixel with respect to single color, a density of at least 6 dots/mm is necessary. In this embodiment, a diameter of one dot is set into 150 μm and an image picture is formed with a density of 6.7 dots/mm in the vertical and horizontal directions; therefore, when an image picture is formed by the sample pixels, the image picture of 7.2×9.6 cm is obtained. Since this size is slightly small, 720×960 dots are needed to obtain an image picture of the size which is 1.5 times as large as the above picture in both directions.

First of all, it will be described a method of sampling the pixels of the number which is 1.5 times larger in the horizontal direction.

FIG. 2 shows a CRT screen.

In the diagram, G denotes a screen; H1, H2, ... are the horizontal scanning lines; HA1, HA2, ... are vertical lines for sampling 640 pixels with regard to one horizontal scanning line; and HB1, HB2, ... are sample lines for sampling 960 pixels with respect to one horizontal scanning line.

Figure 3:
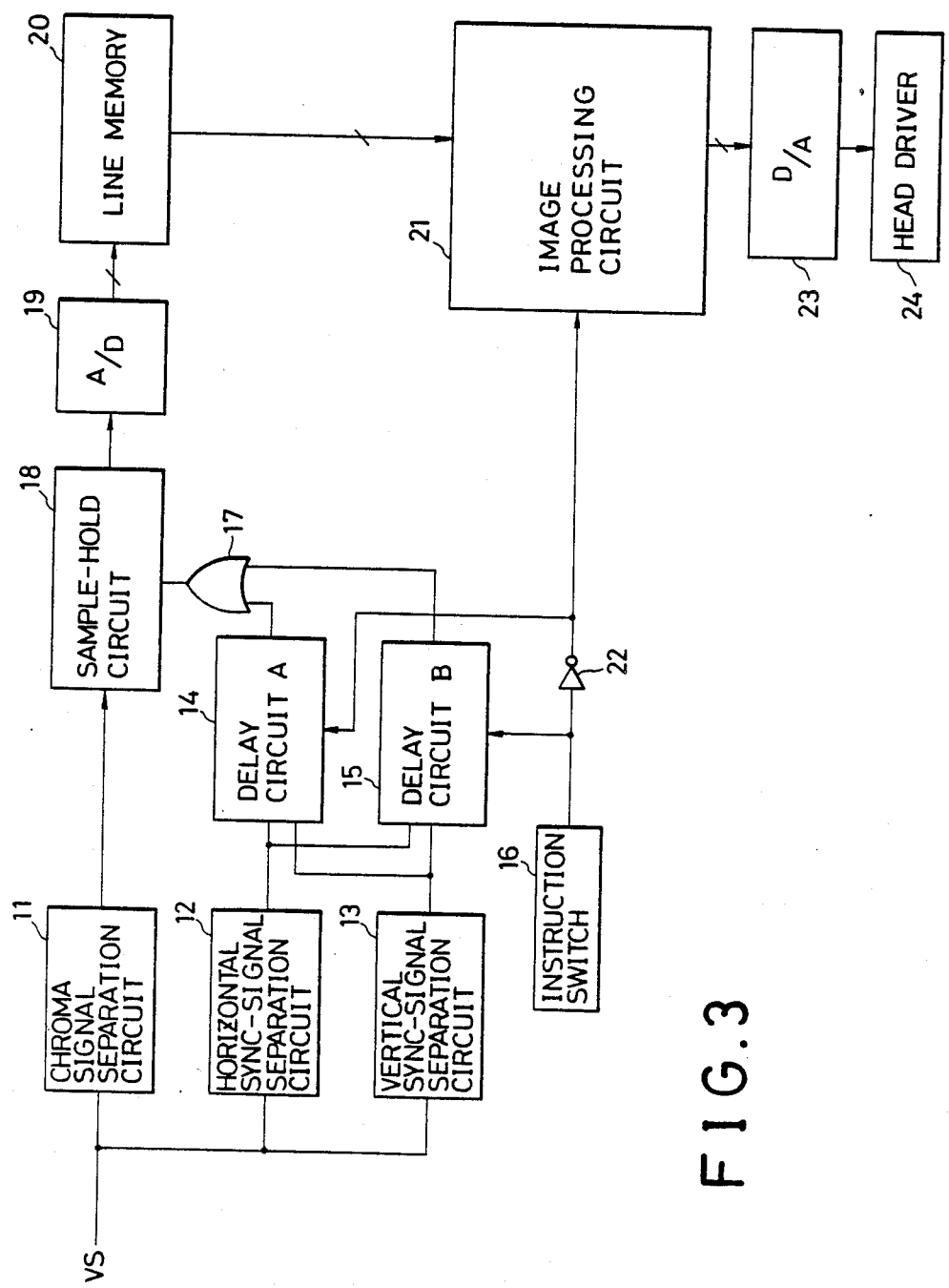
FIG. 3 shows a signal processing block diagram of an ink jet printer to which the present invention can be applied.

The operation will be described below with reference to FIG. 3. FIG. 3 shows a video signal processing circuit of the present embodiment.

In the diagram, a reference numeral 11 denotes a chroma signal separation circuit; 12 and 13 indicate horizontal and vertical sync-signal separation circuits, respectively; 14 and 15 are delay circuits A and B; 16 an instruction switch for instructing the changeover of the sample mode; 17 an OR gate; 18 a sample-hold circuit; 19 an A/D converter; 20 a line memory; 21 an image processing circuit for performing the γ correction, masking processing and interpolation processing; 22 an inverter; 23 a D/A converter; and 24 a head driver for driving an ink jet head.

Since an input video signal VS is a composite video signal including R, G and B signals and horizontal and vertical sync signals, it is separated by the separation circuits 11, 12 and 13, respectively. The chroma signal separated is outputted to the sample-hold circuit 18 and the horizontal and vertical sync-signals are together outputted to the delay circuits A14 and B15. When an output of the instruction switch 16 is at high level, the delay circuit B15 is enabled to sample 960 pixels. On the other hand, when it is at low level, the delay circuit A14 is enabled to sample 640 pixels. The output of the instruction switch 16 is also outputted to the image processing circuit 21, thereby allowing the interpolating operation which will be described later to be executed.

After a predetermined delay time passed from the horizontal sync-signal, the delay circuit A outputs a sample pulse to the sample-hold circuit 18. Since the above-mentioned delay time changes by only ΔtA whenever the vertical sync-signal is inputted, the samplings of HA1, HA2, ... are made possible as shown in FIG. 1.

Similarly, since the delay time from the horizontal sync-signal changes by only ΔtB whenever the vertical sync-signal is inputted, the delay circuit B15 enables the sampling of HB1, HB2, .... Since the ratio of ΔtA:ΔtB has been set into 3:2, the ratio of the number of sample pixels to be obtained becomes 2:3, so that 640 pixels can be sampled with respect to one horizontal scanning line in case of using the delay circuit A, while 960 pixels can be sampled in case of using the delay circuit B.

The chroma signal which was sampled and held by the sample and hold circuit 18 is converted into the digital signal by the A/D converter 19 and is then stored in the line memory 20, thereafter it is transmitted to the image processing circuit 21 and is further converted into the analog signal by the D/A converter 23 and is transmitted to the head driver 24. The head driver 24 applies the applied voltage responsive to the above-mentioned analog signal to the ink jet head, so that the ink jet head discharges the ink of the quantity corresponding to the applied voltage, thereby controlling a density and hue of an image picture.

As the ink jet head, for example, the head disclosed in the specification of U.S. Pat. No. 3,683,212 may be used.

FIG. 4 is a diagram to describe the interpolation of the data which was sampled in the vertical direction in the similar manner as described above. As shown in FIG. 1, 480 pixels of P1 to P480 are sampled in the vertical direction. In FIG. 4, M1 to M720 indicate the positions of the interpolated pixels and P1 to P480 represent the positions of the sampling pixels. The interpolation data is obtained by performing the weighting by the distance on the basis of the data of the sampling pixels of the image picture data P1–P480 at the positions M1–M720.

As is obvious from FIG. 4, the positions of M1 and P1, M4 and P3, M7 and P5, etc. overlap. Namely, the positions of M(3n−2) and P(2n−1) (where, n=1, 2, .., 240) overlap.

Therefore, when the data at the positions $M_x(x=1, \ldots, 720)$ are represented by $DM_x$ and the data at the positions $P_y(y=1, \ldots, 480)$ are represented by $DP_y$, we will have $DM(3n-2)=DP(2n-1)$. In addition, DM2 and DM3 will be represented by $$DM2 = \tfrac{1}{3}DP1 + \tfrac{2}{3}DP2, \quad DM3 = \tfrac{2}{3}DP2 + \tfrac{1}{3}DP3$$

When these expressions are generalized, they can be expressed by $$DM(3n-1) = \tfrac{1}{3}DP(2n-1) + \tfrac{2}{3}DP(2n)$$

$$DM(3n) = \tfrac{2}{3}DP(2n) + \tfrac{1}{3}DP(2n+1)$$

Figure 5:
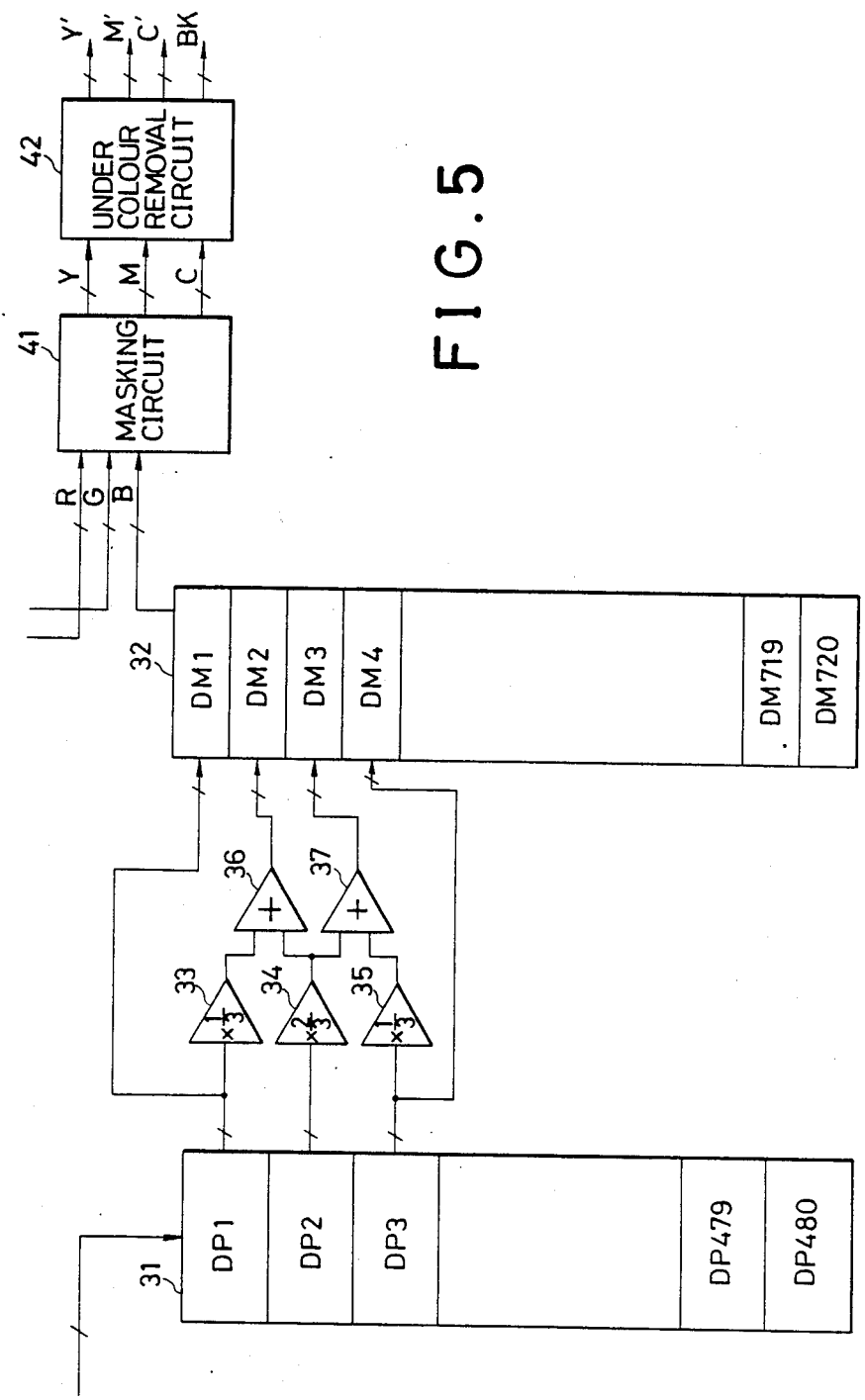
FIG. 5 shows a detailed circuit diagram of an image processing circuit 21.

Such a data interpolation is carried out by the image processing circuit 21 of FIG. 3 and can be realized by, for example, such a circuit as shown in FIG. 5. In FIG. 5, a reference numeral 31 represents a line memory for the sampling pixels of the vertical lines HA1, HA2, ..., and 32 indicates a line memory for the interpolation data of the vertical lines HB1, HB2, .... In addition, numerals 33 and 35 are $\tfrac{1}{3}$ multipliers; 34 is a $\tfrac{2}{3}$ multiplier; and 36 and 37 are adders. The above-mentioned operations are performed by the arithmetic operation circuits 33 to 37.

Such an interpolation circuit is provided individually for each of the chroma signals of R, G and B. The masking processing is executed by a masking circuit 41 on the basis of the interpolation pixel data regarding each color and thereafter the under color removal is carried out by an under color removal circuit 42. Thus, the digital values responsive to the applied voltages to the respective ink jet heads for cyan, magenta, yellow, and black are obtained and they are transmitted to the D/A converter 23 of FIG. 3. Due to such operations, an output density of one dot for each color with respect to one pixel of the interpolation data is obtained and a dot diameter of the ink of each color is controlled in response to its output density, so that a desired hue density is obtained.

In addition, although the sampling operation and the interpolating operation have been realized by the hardware in this embodiment, they can be also realized by a software using a microcomputer and the like.

On the other hand, an example of the NTSC TV signal as the input video signal has been described, but the present invention can be also applied to the video signal or the like which was sent through a transmission line such as a facsimile and the like, in addition to the TV signal such as PAL, SECAM, etc. Moreover, the present embodiment has been described with regard to the printer using the ink jet head, but the present invention can be of course applied to any printers of other types.

On one hand, althrough it is possible to arbitrarily change the ratio of the number of interpolation pixels to be obtained in the vertical direction to the number of horizontal scanning lines in this embodiment, this ratio may be simply set into a predetermined constant ratio.

Furthermore, in this embodiment, an example has been described whereby the sampling is performed at the ratio of 3/2 in the horizontal direction and the interpolation is done in the vertical direction, but any other ratios can be realized.

However, since the resolution power which the input video signal inherently has is such that the number of horizontal scanning lines is 300 or more and the number of vertical scanning lines is about 480 in case of the NTSC signal, even if the above-mentioned ratio was set into a large ratio, an image picture of good quality cannot be derived, so that it is preferable to set the ratio to be up to about 2. In addition, in case of enlarging an image picture, if the ratio is set into such values as 3/2, 4/3, 5/3, 5/4, 7/4, 6/5, 7/5, 8/5, 9/5, and 2 times, i.e., into values which can be expressed by fractions of which an integer value of a denominator is in the order of 6 or less, the interpolating operation of the interpolation circuit also can be rather more easily performed; furthermore, in case of constituting the interpolation circuit by a hardware or a software also, the circuit constitution will become more simple. By expressing the ratio by such fractions, the interpolation pixel coincides with the sample pixel at least once for six times, therefore, it is also possible to suppress the deterioration in resolution power.

As described above, according to the video signal processing method of the present embodiment, even when an image picture was enlarged, it is possible to variably magnify an image picture with keeping good quality and without inviting deterioration in resolution power.

In addition, by setting the ratio into the multiplying ratio which can be expressed by a factor of which an integer value of the denominator is 6 or less, the interpolation circuit can be simplified and the deterioration in resolution power can be suppressed.

Furthermore, in case of the ratio of 2 or less, the deterioration in resolution power can be minimized.

DESCRIPTION OF A SECOND EMBODIMENT

Figure 6:
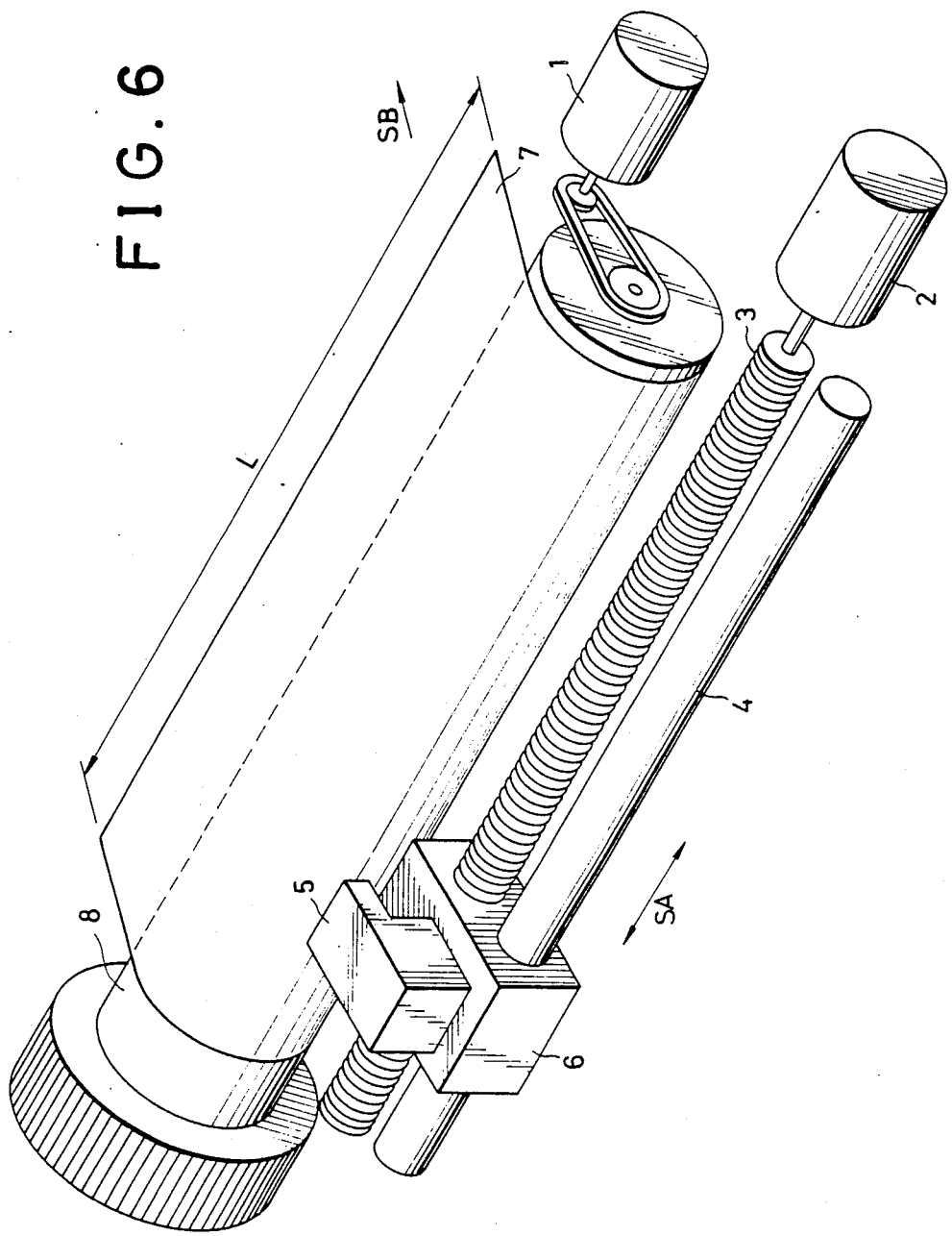
FIG. 6 illustrates a perspective view of the recording section of the ink jet printer.

FIG. 6 illustrates a perspective view of the recording section of an ink jet printer of a second embodiment.

In the illustration, a reference numeral 1 denotes a paper feed motor; 2 is a head advance motor; 3 a screw; 4 a head advance guide; 5 an ink jet head unit; 6 a carriage; 7 a recording paper; 8 a platen; and L represents a maximum main scanning length of the head 5; SA indicates a main scanning direction of the head 5; and SB denotes a paper feed direction (subscanning direction).

The rotating force of the paper feed motor 1 is transferred to the platen 8, so that the recording paper 7 is moved in the direction indicated by an arrow SB by means of the platen 8 and a pinch roller (not shown). Also, the screw 3 is rotated in association with the rotation of the head advance motor 2, so that the head 5 is scanned in the main scanning direction SA. Now, when the recording is performed and the head 5 reaches the side end of the recording paper 7, the paper feed motor rotates to feed the paper by one dot pitch. At the same time, the head advance motor 2 rotates and the head 5 is advanced in the opposite direction, so that the reciprocating recording is performed and this operation is repeated.

Figure 7:
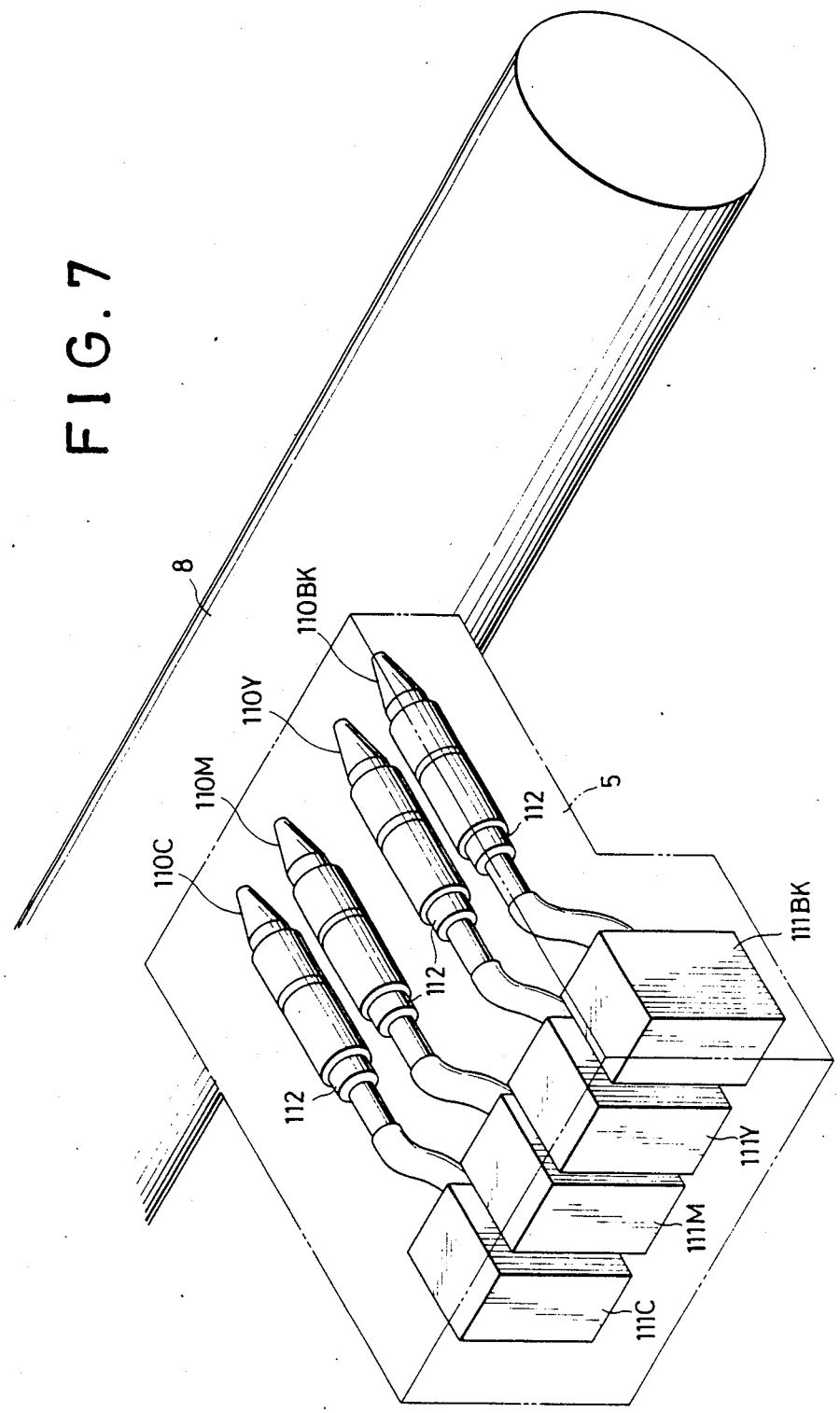
FIG. 7 illustrates a perspective diagram showing a constitution of a head 5.

FIG. 7 illustrates a diagram showing the construction of the head 5. In the drawing, reference numerals 110C, 110M, 110Y, and 110BK indicate ink jet heads for discharging the respective inks of cyan, magenta, yellow, and black, respectively, and 111 represents ink tanks of these heads. Although the heads are arranged in parallel with the main scanning direction in the drawing, they may be arranged in the direction perpendicular to the main scanning direction or may be arranged at the different positions.

On the other hand, as the ink jet head, the head such as disclosed in the specification of U.S. Pat. No. 3,683,212 mentioned previously is used. By changing the voltage to be applied to a cylindrical piezo element 112 of each head, the ink of the quantity corresponding to this applied voltage is discharged, thereby enabling the gradient and color to be reproduced.

Figure 8:
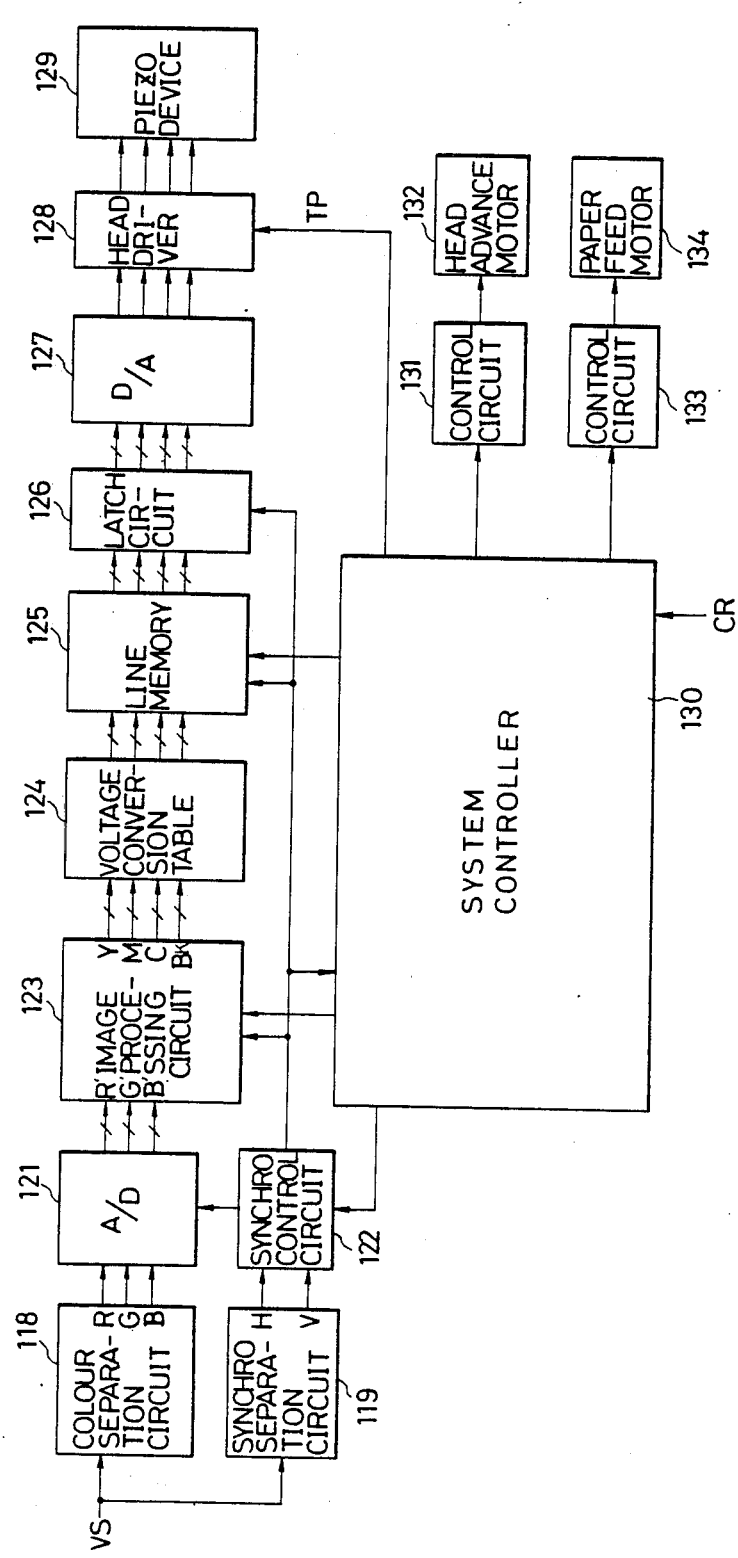
FIG. 8 shows a system block diagram of a video ink jet printer.

FIG. 8 shows a system block diagram of a video ink jet printer of the present embodiment.

In the diagram, VS denotes a composite video signal including chroma signals and sync signals; a reference numeral 118 is a color separation circuit; 119 a sync-signal separation circuit; 121 an A/D converter; 122 a synchro control circuit for performing the sampling control; 123 an image processing circuit; 124 a voltage conversion table; 125 a line memory; 126 a latch circuit; 127 a D/A converter; 128 a head driver; 129 a piezo device of the ink jet head corresponding to 112 of FIG. 7; 130 a system controller; 131 a control circuit for a head advance motor 132; and 133 a control circuit for a paper feed motor 134.

The video signal VS which consists of a plurality of horizontal scanning lines and which includes vertical and horizontal sync-signals in addition to chroma signals is separated into the respective R, G and B chroma signals by the color separation circuit 118. On one hand, the horizontal sync-signal H and the vertical sync-signal V are fetched by the sync-signal separation circuit 119 and are inputted to the synchro control circuit 122. The synchro control circuit 122 allows the A/D converter 121 to sample the respective chroma signals at timings which will be described later in response to the horizontal sync-signal H and the vertical sync-signal V, thereby converting them into the digital signals R', G' and B'.

The operations of the γ conversion, masking processing, under color removal, etc. are carried out for those signals R', G' and B' in the image processing circuit 123. These signals are then converted into the respective chroma signals of Y, M, C, and BK indicative of densities of the inks and these conversion data are further converted into the digital values responsive to the voltages to be applied to the piezo device of each head by the voltage conversion table 124. The data corresponding to the necessary capacity among those data are stored in the line memory 125. In case of performing the reciprocating recording, the data corresponding to for example two main scanning lines are stored. These data are outputted to the latch circuit 126 at desired timings and are further converted into the analog voltages by the D/A converter 127 and are applied to the head driver 128. These head drive voltages are applied to each piezo device 129 in response to discharge clock pulse TP from the system controller 130.

At the same time, the controller 130 allows the head advance motor 132 to be rotated and controlled through the control circuit 131. When the controller 130 receives a carriage return signal CR, it allows the paper feed motor 134 to be driven through the control circuit 133.

Next, the operations of the A/D converter 121 and the synchro control circuit 122 will be described in detail with reference to a circuit diagram of FIG. 9.

Figure 9:
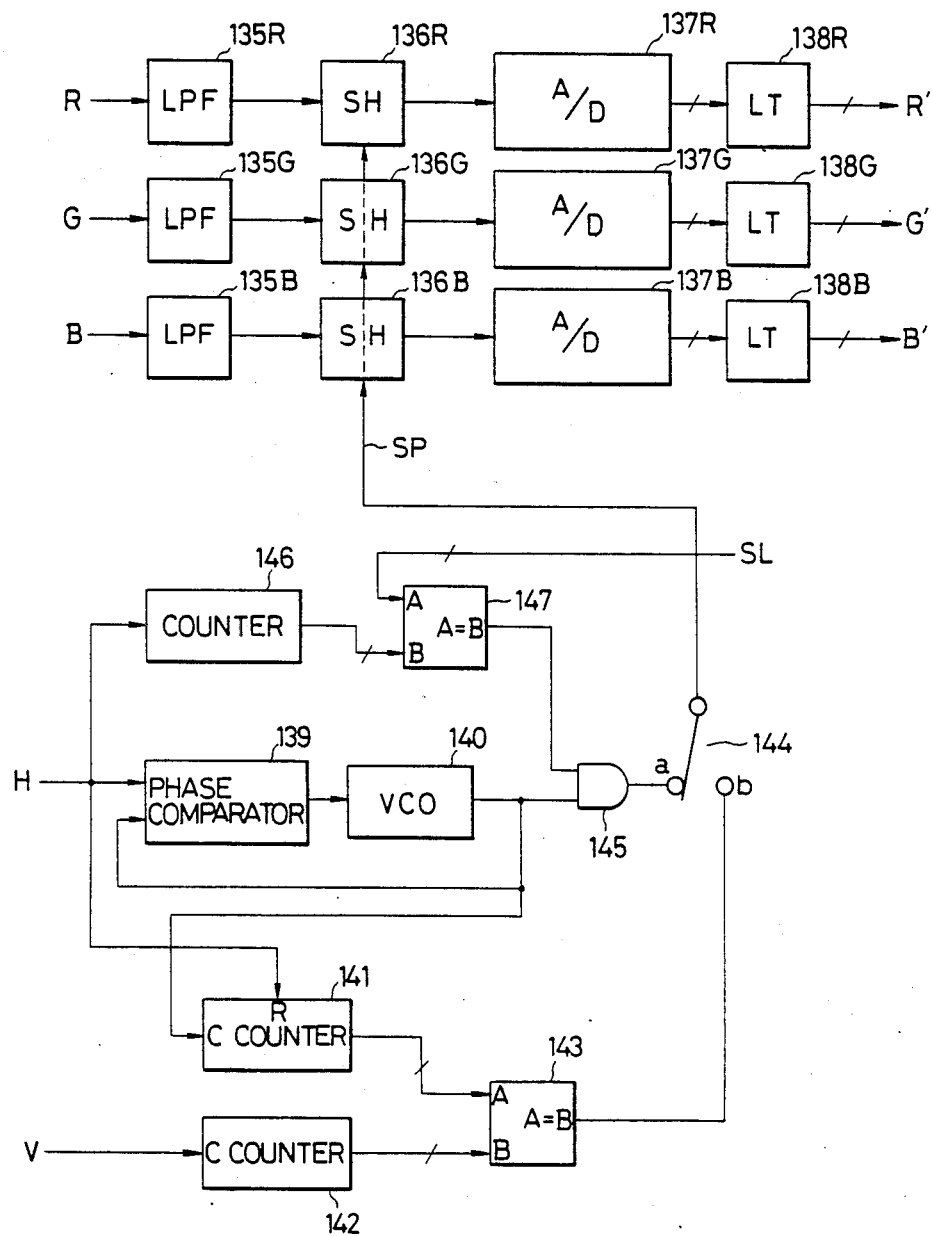
FIG. 9 shows a detailed block diagram of an A/D converter 121 and a synchro control circuit 122 of FIG. 8.

In FIG. 9, reference numerals 135R, 135G and 135B denote low-pass filters for the chroma signals R, G and B, respectively; 136 indicates sample-hold circuits; 137 A/D converters; 138 latch circuits; 139 a phase comparator; 140 a voltage controlled oscillator (hereinbelow, referred to as a VCO) whose output frequency is changed in response to the input voltage; 141, 142 and 146 are counters; 143 and 147 are coincidence circuits; 144 a switch for switching the sampling direction between the horizontal and vertical scanning directions; and 145 an AND gate, respectively.

The low-frequency components are fetched from the respective chroma signals of R, G and B by the low-pass filters 135R, 135G and 135B, and these chroma signals are further sampled and held by the sample-hold circuits 136R, 136G and 136B at timings of the sample pulse SP, respectively. The hold values are converted into the digital signals by the A/D converters 137 and are outputted to the latch circuits 138, respectively.

In case of performing the sampling in the scanning direction of the horizontal scanning lines of the input video signal, the switch 144 is connected to the side of a terminal a (at the position indicated in FIG. 9). The horizontal sync-signal H is processed in the PLL (phase locked loop) circuit which is constituted by the phase comparator 139 and the VCO 140, so that desired sampling pulses are obtained at one horizontal interval (1H). The sampling number at one horizontal interval is set into 480.

The horizontal sync-signal H is also inputted to the counter 146 and the count number of the counter is checked by the coincidence circuit 147 whether or not it coincides with the signal from the controller 130 representing that which number of horizontal scanning line is being sampled at present. Only when this coincidence circuit 147 detects the coincidence with the desired horizontal scanning line, it allows the gate 145 to be opened, thereby outputting an output of the PLL circuit as the sampling pulses SP to the sample-hold circuits 136.

Figure 10A:
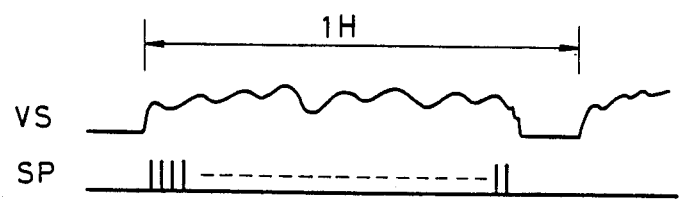
FIGS. 10A and 10B show timing charts to describe the respective sampling methods thereof.

In this way, as shown in FIG. 10A, the sampling in the horizontal scanning direction is executed.

On the contrary, it will be described the case where the switch 144 was connected to the side of a terminal b. The vertical sync-signal V is inputted to the counter 142 and the horizontal sync-signal H resets the counter 141. Thus, the counter 141 counts the output pulses of the PLL circuit and the counter 142 counts the number of vertical sync-signals V.

Figure 10B:
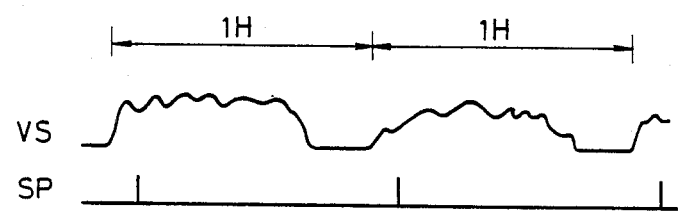

When the coincidence circuit 143 confirms that both are coincident, the coincidence signal is inputted as the sampling pulse SP to the sample-hold circuits 136. In this way, as shown in FIG. 10B, the sampling is performed once at one horizontal scanning interval (1H). Since the sampling positions in the horizontal scanning direction at each 1H are identical at one vertical interval, the sampling in the direction perpendicular to the horizontal scanning direction is made possible. Since the number of scanning lines in the effective picture plane in one vertical interval is almost 480, the sampling is performed 480 times. Therefore, even when the switch 144 is connected to either of the terminals a and b, the sampling number for one time is 480 in both cases, so that it is possible to set the lengths of the main scanning direction of the recording apparatus to be equal.

Although the high-speed accessing A/D converter and memory circuit are needed in the above embodiment, if an analog memory, for example, CCD memory which stores analog information of 1H is used, an A/D converter and a memory circuit which respond the vertical sampling frequency, e.g., 15.75 kHz in case of the NTSC TV signal may be enough.

Figure 11:
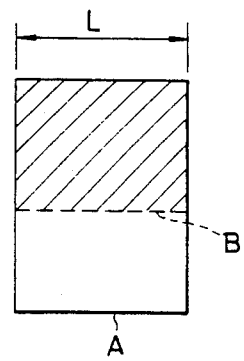
FIG. 11 is a diagram showing a print picture plane according to the present embodiment.

As described above, the samplings in both horizontal and vertical scanning directions are made possible and as shown in FIG. 11, it is possible to reproduce both of the screen A of the normal size and the reduced screen B using the whole length L in the main scanning direction. In addition, the operations such as the removal of a part of the sample pixels in the vertical direction, the interpolation processing, etc. are disused, thereby enabling an image picture with good picture quality to be realized by a simple circuit; therefore, the present embodiment is extremely effective.

DESCRIPTION OF A THIRD EMBODIMENT

Figure 12:
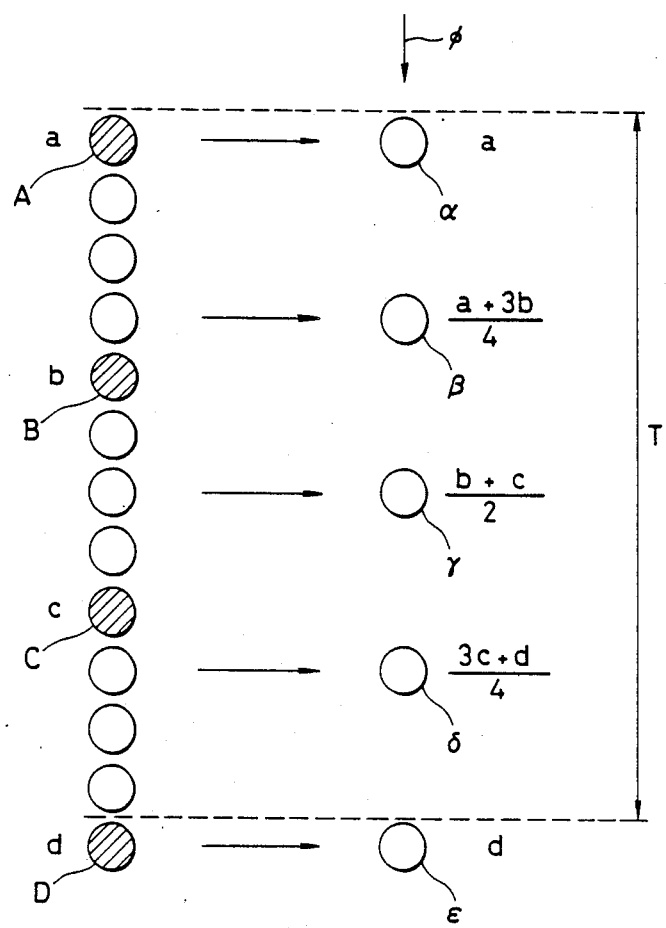
FIG. 12 is a diagram to describe the pixel conversion when the multiplying ratio is 4/3.

An example of the conversion is shown using FIG. 12 in the case where the previously-mentioned multiplying ratio was set into 4/3.

In the drawing, $\phi$ indicates the main scanning direction of a recording apparatus (not shown). A, B, C, and D represent original pixels having the pixel levels of a, b, c, and d, respectively. $\alpha$, $\beta$, $\gamma$, $\delta$, and $\epsilon$ indicate recording pixels.

The recording pixel $\alpha$ has the pixel level of a since it corresponds to the same position as the original pixel A. The recording pixel $\beta$ has the pixel level of $$\frac{a + 3b}{4}$$

of which the weighted mean of a and b at the ratio of 1:3 was obtained since when the distance from the original pixel B was set into 1, the distance from the original pixel A is 3. The recording pixel $\gamma$ has the pixel level of $$\frac{b + c}{2}$$

since it locates at the intermediate position between the original pixels B and C. The recording pixel $\delta$ has the pixel level of $$\frac{3c + d}{4}$$

of which the weighted mean of c and d at the ratio of 3:1 was obtained since when the distance from the original pixel C was set into 1, the distance from the original pixel D is 3. The recording pixel $\epsilon$ has the pixel level of d since it corresponds to the same position as the original pixel D. By repeating the period T in FIG. 12, the pixel levels of all of the recording pixels are obtained. In this way, three original pixels can be converted into four recording pixels, so that in case of recording the original pixels with the same recording density as the recording density when the original pixels were recorded as they are as the recording pixels, it is possible to obtain the image picture which is 4/3 times larger in the main scanning direction. The similar processings are possible in the sub-scanning direction.

Figure 13:
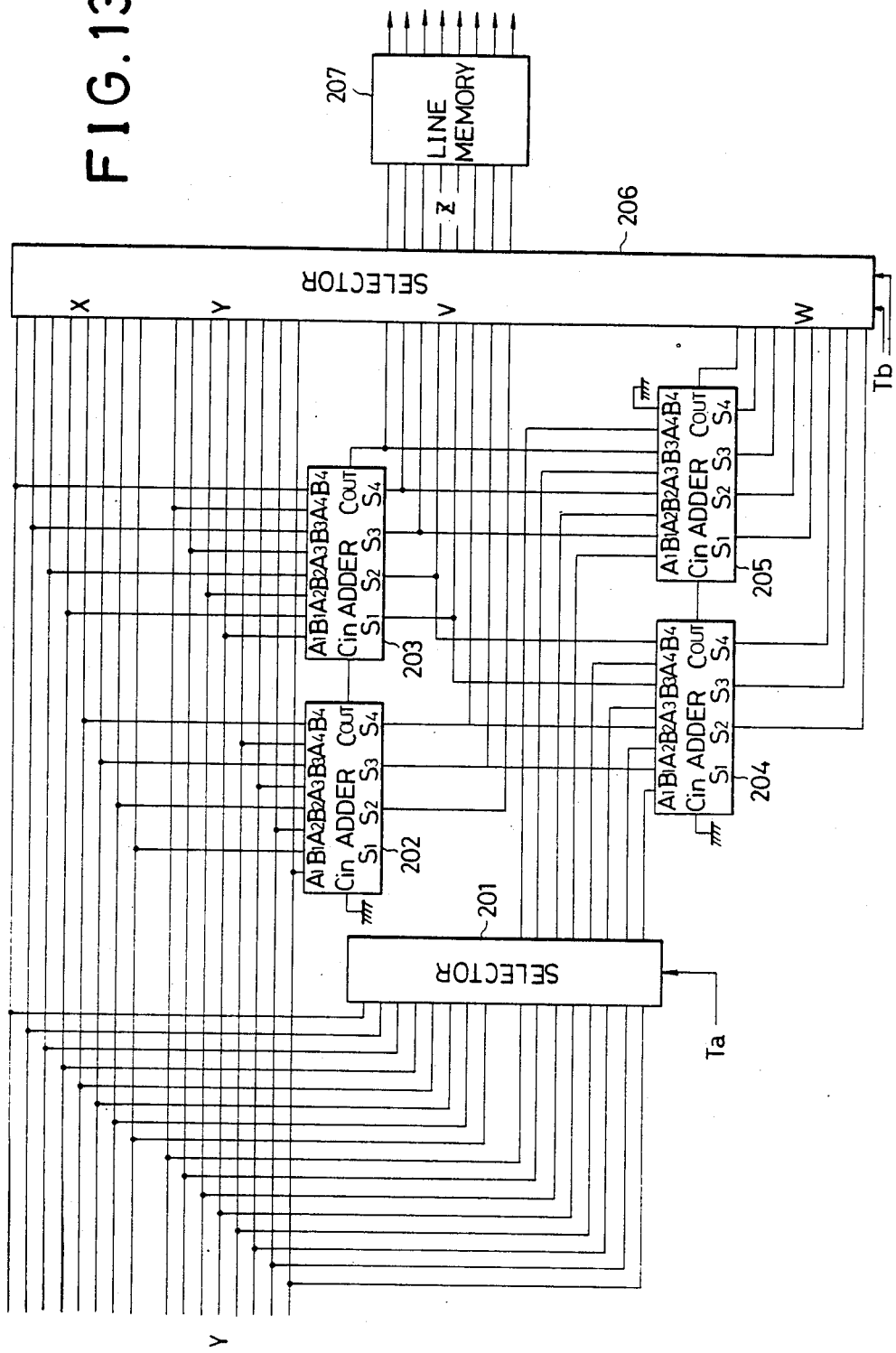
FIG. 13 shows a circuit diagram to perform the pixel conversion of FIG. 12.

FIG. 13 shows a practical circuit diagram for converting three original pixels into four recording pixels. The pixel levels of the original pixels and the recording pixels are indicated by the digital values of eight bits. X and Y are 8-bit digital values of the input original pixels and both pixels are neighboring in the main scanning direction. Z is an output digital value of the interpolated recording pixel.

In FIG. 13, a reference numeral 201 denotes a selector for selecting either X or Y and outputting it, and 202, 203, 204, and 205 are four-bit adders each having input terminals $A_1$-$A_4$, $B_1$-$B_4$, output terminals $S_1$-$S_4$, a carrie input terminal $C_{in}$, and a carrie output terminal $C_{out}$. Numeral 206 is a selector for selecting one of the inputs X, Y, V, and W; 207 is a line memory; and ta and tb are change-over timing signals for the selectors 201 and 206.

The selector 201 can be constituted using two models CD4019 made by RCA Co., Ltd; the adders 202 to 205 can be constituted by model CD4008 of the same company; and the selector 206 can be constituted using four models CD4052 of the same company.

The circuit operations will now be sequentially described hereinbelow.

(1) Now, assuming that a value of X is a of FIG. 12 and a value of Y is b of FIG. 12, the selector 206 outputs X, i.e., outputs a as Z. This output is stored in the line memory 207.

(2) Next, the adders 202 and 203 together operate as the 8-bit adder, thereby calculating a +b. Since the least significant bit ($S_1$ of the counter 202) among the outputs is not used (one bit is shifted), the output of the adders 202 and 203 eventually becomes $$\frac{a + b}{2}.$$

This output $$\frac{a + b}{2}$$

is inputted to either one of the adders 204 and 205. Since the selector 201 selects Y at this time, the adders 204 and 205 perform the operation of $$\frac{a + b}{2} + b.$$

Since the adders 204 and 205 do not output the least significant bit similarly to the adders 202 and 203, its output finally becomes $$\frac{a + 3b}{4},$$

so that the selector 206 selects the input W and it is stored in the line memory 207.

(3) Then, a value of the input X becomes b and a value of the input Y becomes c. As described above, the adders 202 and 203 carry out the operation of $$\frac{b + c}{2}$$

and the selector 206 selects the input V, so that the value of $$\frac{b + c}{2}$$

is stored in the line memory 207.

(4) Next, a value of the input X becomes c and a value of the input Y becomes d. The adders 202 and 203 execute the operation of $$\frac{c + d}{2}$$

and its output is inputted to the adders 204 and 205. The adders 204 and 205 add the value c which was selected by the selector 201 and so that the value of $$\frac{c+d}{2},$$

$$\frac{3c+d}{4}$$

is consequently inputted to the input W of the selector 206. The selector 206 selects the input W and $$\frac{3c+d}{4}$$

is stored in the line memory 207.

Figure 14:
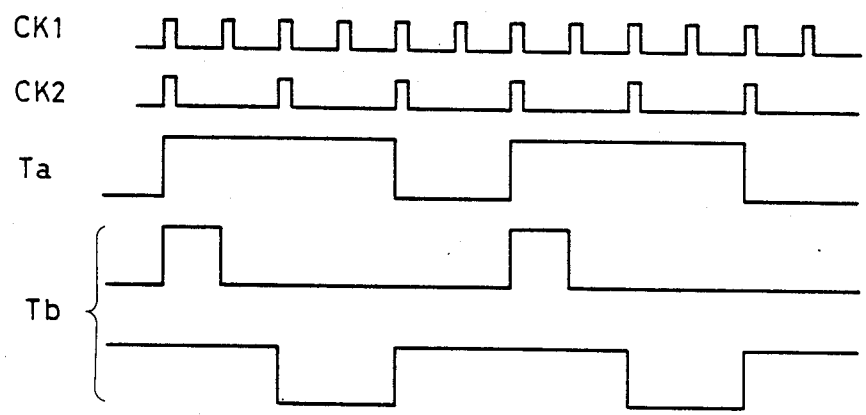
FIG. 14 shows timing charts at each section of FIG. 13.

By repeating the above operations (1) to (4), it is possible to convert the original pixels into the recording pixels in case of the multiplying ratio of 4/3. FIG. 14 shows timing charts of FIG. 13, in which there are shown the values of X and Y at each timing, the inputs to be selected by the selectors 201 and 206, the timing signals $T_a$ and $T_b$, and the clocks CK1 and CK2 for forming the timing signals $T_a$ and $T_b$. Such timing signals $T_a$ and $T_b$ can be easily formed from the clocks CK1 and CK2 by a person skilled in the art.

The data stored in the line memory 207 is transferred to the recording apparatus for example at every one main scanning line.

The case of the multiplying ratio of 4/3 has been described above; however, even in the cases where the multiplying ratio is 2/3, 8/3, 16/3, 2/5, 4/5, 8/5, 16/5, 2/7, 4/7, 8/7, 16/7, etc., it is possible to obtain the recording pixels using the bit shift method and the adders. In other words, in the case where the multiplying ratio can be expressed by $2^M/2n+1$ (where, M, n are positive integers), the digital values of the original pixels can be converted into the digital values of the recording pixels using the adders and the bit shift method.

FIG. 15 shows an example in case of the multiplying ratio of 8/7. In the drawing, A', B', ..., H' denote original pixels having the pixel levels of a', b', ..., h', respectively, and $\alpha'$, $\beta'$, ..., l' indicate recording pixels, which are converted into the pixel levels as shown at the right end in FIG. 15, respectively. In case of the multiplying ratio of 8/7, the information of 1/8 may be formed by the bit shift operations which are further executed one more time than in the case of 4/3. Namely, the shift operations of the same number of times as M are executed.

As described above, according to the present invention, various multiplying ratios can be obtained using the bit shift method and the addition operations and it is also possible to obtain a recording image picture of a desired size by a simple processing circuit without changing dot densities.

In particular, in case of M=4 or less, the number of shifts is limited to four times or less, thereby enabling the circuit constitution to be simplified.

As described above, according to the present invention, an image picture of a predetermined or arbitrary size can be obtained while preventing deterioration in picture quality such as resolution power and the like. In addition, the circuit for the interpolation processing can be also remarkably simplified.

The present invention is not limited to the above-described embodiments, but many variations and modifications are possible within the spirit and scope of the appended claims for the invention. Particularly, for the form of the printer, the invention is not limited to the ink jet printer but it may be also applied to an electrophotographic printer, an electrostatic printer, a thermal printer, a thermal transfer copying printer, etc.

What is claimed is:

1. Video signal processing method of fetching pixel signals by sampling an input video signal comprising a plurality of horizontal scanning lines, said method comprising the steps of:
    setting the ratio represented by the rate of the number of vertical pixels to be obtained in the vertical direction to the number of horizontal scanning lines;
    obtaining pixel signals indicative of said vertical pixels in the vertical direction by interpolation on the basis of pixel signals sampled from a plurality of adjacent horizontal scanning lines; and
    sampling the input video signal in the horizontal direction at a horizontal sampling frequency determined by said ratio, wherein the sampling of one line in the vertical direction is performed in one vertical interval of the video signal and the horizontal position of one line in the vertical direction to be sampled changes at every vertical retracing interval of the video signal.

2. Video signal processing method according to claim 1, wherein said ratio is expressed by a fraction of which an integer value of the denominator is 6 or less.

3. Video signal processing method according to claim 1, wherein said ratio is 2 or less.

4. Video signal processing method according to claim 1, wherein said ratio can be changed.

5. A video signal processing system comprising:
    separating means for separating a horizontal sync-signal and vertical sync-signal from an input video signal;
    sampling signal forming means for forming sampling signals which were delayed using said horizontal sync-signal as a reference;
    delay time changing means for changing the delay time of said sampling signal forming means in response to said vertical sync-signal;
    sampling means for sampling the input video signal responsive to said sampling signal; and
    means for controlling the amount of change of the delay time of said changing means, said controlling means including manual instruction means for instructing the amount of the change of the delay time.

6. A system according to claim 5, further including interpolating means for interpolating the signal sampled by said sampling means in accordance with said change amount.

7. A system according to claim 5, further including interpolating means for interpolating the signal sampled by said sampling means in accordance with an instruction from said instruction means.

8. A system according to claim 6, wherein the ratio of the number of interpolating pixels to be obtained to the number of sampling pixels of said interpolating means is 2 or less.

9. A system according to claim 6, wherein the ratio of the number of interpolating pixels to be obtained to the number of sampling pixels of said interpolating means is expressed by a fraction of which the denominator is 6 or less.

10. An image processing system comprising:

input means for inputting digital values representative of a plurality of pixels which are sequential in the direction of the height of an image picture;
addition means for adding the digital values of said plurality of pixels;
bit shift means for bit-shifting said addition result; and
selection means for selecting one of the digital values to be obtained by such bit shift or the input digital values.

11. An image processing system according to claim 10, wherein the ratio of the number of pixels to be obtained to the number of pixels to be inputted by said input means is set at $$\frac{2^M}{2n + 1}$$

(where, n and M are positive integers).

12. An image processing system according to claim 11, wherein M is 4 or less.

13. An image processing system comprising:
input means for inputting digital values representative of a plurality of pixels which are sequential in the direction of the width of an image picture;
addition means for adding the digital values of said plurality of pixels;
bit shift means for bit-shifting said addition result; and
selection means for selecting one of the digital values to be obtained by such bit shift or the input digital amount.

14. An image processing system according to claim 13, wherein the ratio of the number of pixels to be obtained to the number of pixels to be inputted by said input means is set into $$\frac{2^M}{2n + 1}$$

(where n and M are positive integers).

15. An image processing system according to claim 14, wherein M is 4 or less.

16. Image signal processing method comprising the steps of:
setting the ratio of the number of recording pixels to the number of original pixels in the direction of the height of an image picture at $$\frac{2^M}{2n + 1}$$

(where n and M are positive integers):
inputting the input image signal;
sampling the input image signal;
converting the values of the sampled original pixels into digital values; and
processing the digital values of the original pixels by a bit shift method and an addition operation to obtain digital values of the recording pixels.

17. An image signal processing method according to claim 16, wherein M is 4 or less.

18. An image signal processing method comprising the steps of:
setting the ratio of the number of recording pixels to the number of original pixels in the direction of the width of an image picture at $$\frac{2^M}{2n + 1}$$

(where n and M are positive integers):
inputting the input image signal;
sampling the input image signal;
converting the value of the sampled original pixels into digital values; and
processing the digital values of the original pixels by a bit shift method and an addition operation to obtain digital values of the recording pixels.

19. An image signal processing method according to claim 18, wherein M is 4 or less.

* * * * *

UNITED STATES PATENT AND TRADEMARK OFFICE
CERTIFICATE OF CORRECTION

PATENT NO. : 4,658,300
DATED : April 14, 1987
INVENTOR(S) : HIDEAKI KAWAMURA, ET AL.

It is certified that error appears in the above-identified patent and that said Letters Patent is hereby corrected as shown below:

COLUMN 9

Line 66, "carrie input" should read --carry input--.
    Line 66, "a carrie" should read --a carry--.
    Line 68, "ta" should read --Ta--.

COLUMN 10

Line 1, "tb" should read --Tb--.

COLUMN 11

Line 42, "1'" should read -- $\ell'$ --.

Signed and Sealed this

Twenty-second Day of September, 1987

Attest:

DONALD J. QUIGG

Attesting Officer      Commissioner of Patents and Trademarks